United States Patent
Uhl

[11] 3,906,132
[45] Sept. 16, 1975

[54] PREFINISHED OVERLAY PAPER

[75] Inventor: Wyman F. Uhl, Sterling, Mass.

[73] Assignee: Litton Business Systems, Inc., Fitchburg, Mass.

[22] Filed: Sept. 10, 1973

[21] Appl. No.: 395,726

[52] U.S. Cl. .............. 428/152; 156/209; 156/219; 156/220; 156/221; 264/284; 264/319; 428/156
[51] Int. Cl.² ............................................. B32B 3/20
[58] Field of Search .......... 161/128, 116, 250, 200, 161/DIG. 3, DIG. 4, 719, 162, 270; 156/219, 220, 221; 117/152, 155 UA; 264/284, 319

[56] References Cited
UNITED STATES PATENTS

| | | | |
|---|---|---|---|
| 2,388,184 | 10/1945 | Ripper | 161/263 |
| 2,579,949 | 12/1951 | Minnear | 161/DIG. 4 |
| 2,633,430 | 3/1953 | Kellgren et al. | 161/128 |
| 2,872,094 | 2/1959 | Leptiew | 117/152 |
| 3,042,563 | 7/1962 | Shearer et al. | 161/250 |
| 3,222,209 | 12/1965 | Brundige et al. | 117/152 |
| 3,413,188 | 11/1968 | Allen | 161/DIG. 4 |
| 3,556,929 | 1/1971 | Fellows | 161/162 |
| 3,677,882 | 7/1972 | Jahns, Jr. | 161/264 |
| 3,684,649 | 8/1972 | Shelton et al. | 161/128 |
| 3,698,978 | 10/1972 | McQuade, Jr. | 161/5 |
| 3,793,125 | 2/1974 | Kunz | 161/DIG. 3 |

Primary Examiner—George F. Lesmes
Assistant Examiner—Stanley S. Silverman
Attorney, Agent, or Firm—Arthur T. Groeninger

[57] ABSTRACT

An overlay sheet adapted to be molded and laminated to a resin impregnated fiberglass batting or the like to form a contoured decorative laminate for horizontal and vertical surfacing, said overlay sheet being creped prior to molding and lamination to allow the same to expand in the contoured areas formed during molding and lamination, said overlay sheet including a base sheet of paper which is unpigmented so as to allow fine creping, said overlay sheet being coated to cover and provide a decorative surface for said fiberglass batting and including colloidal silica pigment which prevents the coating from flattening out after creping.

2 Claims, 4 Drawing Figures

PATENTED SEP 16 1975  3,906,132
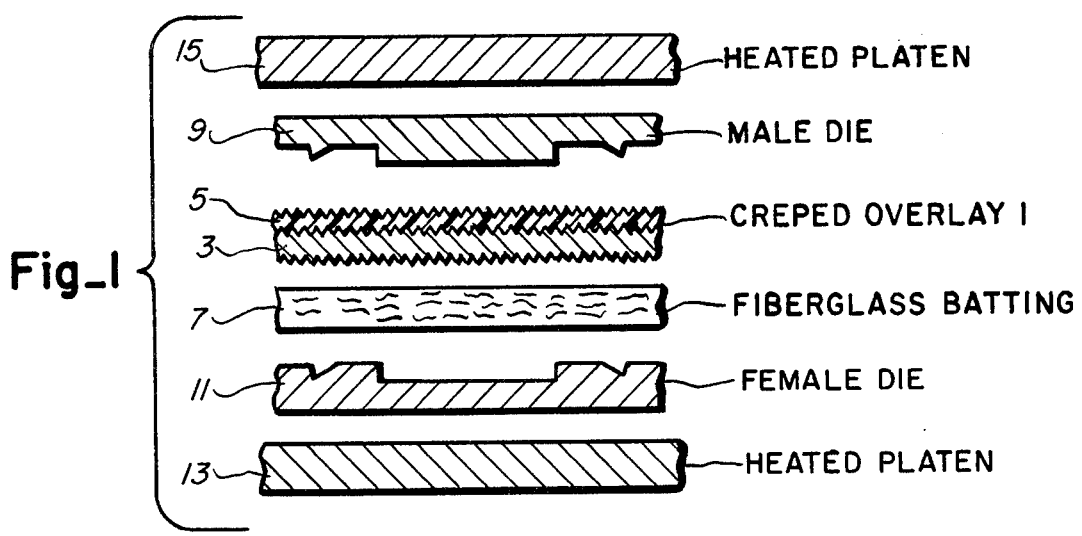
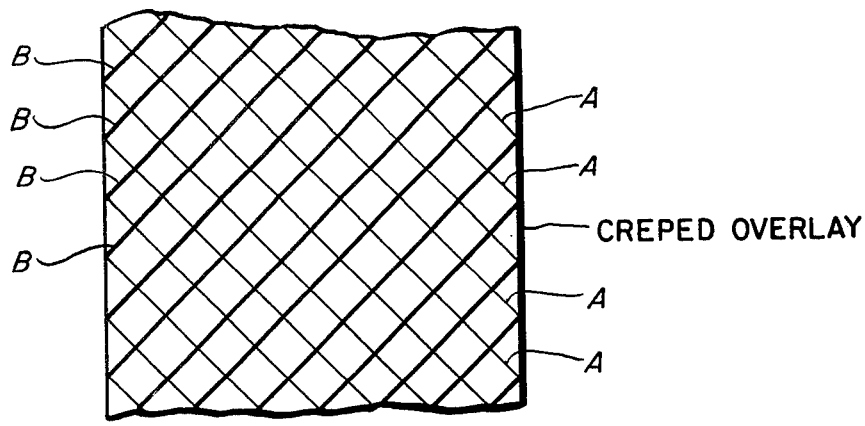
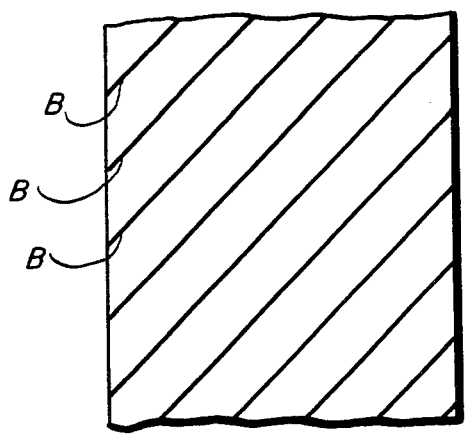 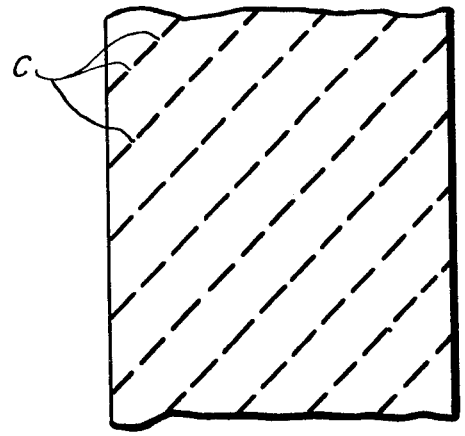

PREFINISHED OVERLAY PAPER

FIELD OF THE INVENTION

This invention relates to decorative laminates wherein a decorative overlay sheet is molded and laminated to a batting of fiberglass or other supporting substrate. U.S. Pat. No. 13,899 which issued to Amies on Dec. 11, 1855; U.S. Pat. No. 1,698,242 which issued to Robinson on Jan. 8, 1929; U.S. Pat. No. 1,866,312 which issued to Loetscher on July 5, 1932; U.S. Pat. No. 2,219,251 which issued to Catini on Oct. 22, 1940; U.S. Pat. No. 2,684,314 which issued to Ross on July 20, 1954; U.S Pat. No. 3,031,959 which issued to Libberton on May 1, 1962; U.S. Pat. No. 3,301,728 which issued to Swartz on Jan. 31, 1967; U.S. Pat. No. 3,654,044 which issued to Hirota on Apr. 4, 1972; U.S. Pat. No. 3,661,688 which issued to Wheeler on May 9, 1972; and U.S. Pat. No. 3,698,978 which issued to McQuade, Jr. on Oct. 17, 1972 were discovered in a prior art search including Class 156, subclass 220.

BACKGROUND OF THE INVENTION

This invention relates to the field of decorative laminates more particularly to ceiling tiles formed by molding phenolic impregnated fiberglass batting. Heretofore, this batting had to be spray painted after it was molded to cover and provide a decorative surface for the batting.

The tiles are formed by first impregnating the fiberglass batting with a phenolic resin sprayed from a water solution. The impregnated fiberglass is then overlayed with a non-woven material to impart paint holdout to the fiberglass. This overlay is laminated and molded under heat and pressure to the fiberglass. Since the laminate is yellow due to the show through of the cured phenolic, it is then spray painted by passing the laminate through a tunnel which includes spray painting stations throughout the length thereof.

The painting step is messy and costly. As tile patterns are changed, the paint heads must be reset to get paint coverage on the whole face area of the tile.

BRIEF DESCRIPTION OF THE PRESENT INVENTION

The present invention eliminates the painting step by providing a coated overlay sheet for the fiberglass batting which has the desired covering and decorative surface and which can be laminated and molded to the fiberglass batting without deterioration of the color of the overlay.

Since the overlay is laminated to the batting in substitution for the non-woven overlay above described, no additional steps are involved.

The coating on the overlay imparts the decorative surface coating to the tile. Prior to laminating and molding, the coated overlay is creped to allow it to stretch in contoured areas formed during the molding step. The coating includes colloidal silica so that the coating is not crepe resistant and allows the coating to be molded and laminated without loss of bond to the base paper. In addition, the silica acts as an opacifying pigment which in combination with conventional pigment additions produces a synergestic opacifying effect.

DRAWINGS

FIG. 1 is an exploded cross sectional view showing the invention in a laminating and molding press prior to lamination.

FIG. 2 is a schematic plan view illustrating the double creped overlay sheet of the present invention.

FIG. 3 is a schematic plan view illustrating the double creped overlay as it more accurately appears in commercial practice.

FIG. 4 is a schematic illustration of the double creped overlay sheet of the present invention with spaced area of the crepe flattened out so as to provide a light scattering effect thereby eliminating shadowing.

DETAILED DESCRIPTION

Referring to FIG. 1, the invention is shown prior to assembly as comprising a creped coated overlay sheet 1 comprising a base sheet of paper 3 having an acrylic coating 5 thereon. The coated overlay 1 is adapted to be laminated to a fiberglass batting 7 which is impregnated with a phenolic resin as conventionally used in making ceiling tiles. The batting 7 and the overlay sheet 1 are placed between male and female dye members 9 and 11 which are adapted to impart a desired texture or contour to the finished laminate. Pressure and heat is applied to the assembly by heated platens 13 and 15 and the phenolic resin in the batting cures and adheres the overlay to fiberglass batting 7.

The laminating step is conventional and is carried out at a temperature range between 300°F and 500°F, for 30 to 75 seconds in a pressure range so as to compress the batting from about one inch or larger to about one sixteenth of an inch.

The overlay sheet 1 is creped by what is referred to as X crepe to describe crossing sets of creping crinkles which are diagonally disposed in the direction of the web. Sheets of this type, which are universally stretchable, have hitherto been made in accordance with the teachings of a number of patents including U.S. Pat. No. 2,008,181 Kemp, U.S. Pat. No. 2,008,182 Kemp, U.S. Pat. No. 2,071,347 Kemp, U.S. Pat. No. 2,399,256 Rowe, U.S. Pat. No. 2,567,967 Rowe, U.S. Pat. No. 2,610,935 Rowe, and U.S. Pat. No. 3,476,644 Krehnbrink.

The creping process is described in detail in the foregoing patents and by this reference incorporated herein but briefly it comprises the steps of dunking the paper sheet in water, then applying a rosin to the sheet so that it will adhere to a drum and finally peeling the sheet off a drum with a blade which causes the paper to crinkle much like paint which is scrapped from a surface.

This base sheet for the overlay must be unpigmented because pigments, being abrasive in nature, will dull the creping blade's knife edge as the paper is peeled from the drum by the knife edge. As dulling occurs, more breaking action is offered to the paper webs forward motion resulting in a more coarse rather than uniform crepes which are preferred in the present invention. The amount of crinkles per inch will depend on the amount of stretch to be imparted to the sheet.

As shown in FIG. 2, the crinkles are shown as extending diagonally in crossed paths. To accomplish this, the sheet is processed to provide a first set of creping crinkles such as A and then again processed to provide a crossing set of crinkles B. The showing in FIG. 2 is exagerated because in commercial practice the second processing substantially flattens out the first set of creping crinkles but the sheet still maintains universal stretch. Accordingly, FIG. 3 represents a more accurate showing of the final crinkled paper.

The flattening of the first set of creping crinkles causes a problem when the invention is used as a ceiling tile because the final product has continuous grooves which cause irregular light reflection and a yellowing effect. This can be overcome by further processing the sheet by embossing spaced areas C of the creping crinkles so that they flatten out thereby producing a dimpled pattern as shown in FIG. 3. The embossing can be carried out by use of a conventional male die which can be pressed into the sheet in any conventional embossing press.

While not essential, base sheet 3 of overlay 1 is preferably made from pulp having high heat stability so as to minimize discoloration during molding and lamination. While such is covered by coating 5, some show through of this degradation would occur.

The selection of pulps having high heat stability is a matter of skill within the art and generally these comprise dirt free types such as prime bleached kraft, alpha cellulose etc.

The sheet 3 should also have water holdout to hold out the subsequently applied coating 5 and rosin applied during creping. For this purpose, conventional rosin size may be added to the paper.

It is also desirable that the base sheet 3 have some wet strength so as to withstand the creping process without tear. For this purpose, conventional wet strength agents such as a melamine formaldehyde may be added. Alum may be added to set the wet strength agent at a pH of 4 – 5.

The coating 5 is preferably formulated using an acrylic binder or acrylic acetate copolymer in order to provide high temperature color stability and the temperature conditions to which the processing of the invention is subjected.

In order to impart the required decorative surface, coating 3 is pigmented. Any conventional opacifying pigment may be used including, e.g. titanium dioxide, aluminum oxide, zinc oxide, magnesium oxide, zinc sulfide, clays, antimony trioxide etc. Colored pigments may be selected for tiles colored other than white.

It has been found that the coating 5 can be greatly improved by the addition of colloidal silica to the pigment mixture. The theory behind the foregoing is not understood but it would appear that the silica renders the coating somewhat porous which allows the film to wrinkle in the areas of the crepe. Without this addition, the coating could be flexible and any crepe imparted thereto would relax again to a flat sheet. In addition, the small particle size of the silica serves to better disperse the accompanying pigment and its own large surface area acts as a good reflector of light. Reference to colloidal silica is meant to define silica having a particle size of less than 60 millimicrons.

The amount of colloidal silica in coating 5 can be varied between 5 parts to 50 parts by weight of said coating. Below this range, the coating remains too flexible and will flatten out. Above this range, the coating is too porous and will substantially craze during creping.

The acrylic coating 5 can be applied by any conventional technique such as air knife, reverse roll, or other conventional coating methods and is applied to base sheet 3 prior to creping.

The coating is applied in a range from 12 to 25 pounds per ream to impart suitable covering power to the sheet. The following is a specific Example of the present invention.

EXAMPLE I

A fiberglass batting was prepared by conventional technique with the fiberglass being sprayed with a phenolic resin from a water solution which is dried down to about 4 – 5 percent moisture bringing the phenolic to a B stage of cure.

This was then laminated to a sheet of coated acrylic overlay sheet which was prepared as follows:

A base sheet of paper was prepared using the following formulations (parts are by weight):

| 1. | | |
|---|---|---|
| Superior (prime or bleached kraft) | | 60 parts |
| Weyerhaeuser AA (alpha cellulose) | | 40 parts |
| Rosin | | 2 parts |
| Melamine Formaldehyde | | .75 parts |

The formulation was adjusted to a pH of 5 by an addition of alum. After the same was mixed in a conventional pulper, the sheet was formed on a conventional fordrinier machine and dried.

This sheet was then overcoated with coating having the following formulation:

| 2. | Acrylic resin | (40% solids water dispersion) | 50 parts |
|---|---|---|---|
| | Titanium dioxide | (50% solids water dispersion) | 100 parts |
| | Colloidal silica | (50% solids water dispersion) | 50 parts |

This coating was applied using an air knife to provide a coating of about 18 to 20 pounds per ream. The coated sheet was then creped by the process hereinbefore described with the creping blade engaging the uncoated side of the sheet. The coated creped sheet was then placed on top of the fiberglass, hereinbefore described, and placed between two heated platens having male and female dye members to impart a decorative contour to the laminate. The platens were drawn together on the assembly while at a temperature of 360°F for a period of 60 seconds. The pressure applied was sufficient to compress a one and one half inch bat of fiberglass to one sixteenth of an inch.

While one embodiment of the invention has been described, it is to be understood that variations may be made as would occur to a chemist skilled in the art.

The laminate was removed as its surface was uncrazed and brilliantly white.

What is claimed is:

1. A process for forming a ceiling tile comprising:
   a. impregnating glass fibers batting with a thermosetting phenolic resin,
   b. placing acrylic coated, X creped paper overlay sheet over said batting with said coating being exposed, the coating containing an opacifying pigment, about 5 to 50 parts by weight of colloidal silica and an acrylic binder,
   c. applying heat and pressure to adhere said overlay sheet to said batting and to form said overlay and batting into a contour of desired shape.

2. A product prepared by the process of claim 1.

* * * * *